United States Patent [19]
Gumpel

[11] Patent Number: 5,393,109
[45] Date of Patent: Feb. 28, 1995

[54] PIPE CONNECTION HAVING A CUTTING RING

[75] Inventor: Paul Gumpel, Bodman-Ludwigshafen, Germany

[73] Assignee: H. Schwer GmbH Edelstahl-Fittings, Denkingen, Germany

[21] Appl. No.: 106,613

[22] Filed: Aug. 16, 1993

[30] Foreign Application Priority Data

Apr. 6, 1993 [DE] Germany ............................ 4311278

[51] Int. Cl.⁶ ............................................. F16L 13/14
[52] U.S. Cl. ........................... 285/382.7; 285/422; 72/367
[58] Field of Search ............... 285/382.7, 422, 342, 285/343; 72/367; 148/222, 226, 513, 514, 676, 423

[56] References Cited

U.S. PATENT DOCUMENTS

| | | | |
|---|---|---|---|
| 3,007,721 | 11/1961 | Schmohl et al. | 285/382.7 X |
| 3,092,405 | 6/1963 | Wurzburger | 285/382.7 X |
| 3,120,969 | 2/1964 | Schmohl | 285/382.7 X |
| 3,512,812 | 5/1970 | Kreidel et al. | 285/382.7 X |
| 3,643,984 | 2/1972 | Bucceri | 285/382.7 X |

*Primary Examiner*—Dave W. Arola
*Attorney, Agent, or Firm*—Bachman & LaPointe

[57] ABSTRACT

In a pipe connection having a cutting ring comprising a metallic compound, in particular an alloy with the constituents CrNiMo, which cutting ring surrounds the pipe wall and can be pressed into same with at least one cutting edge, the cutting ring is cut to length and shaped from an elongate portion, in particular a hollow profile member or tube, that is drawn from stainless steel and cold hardened. A cutting ring (16) according to the invention of that kind is preferably cut to length from a tube drawn from stainless steel, and then shaped and cold hardened.

14 Claims, 1 Drawing Sheet

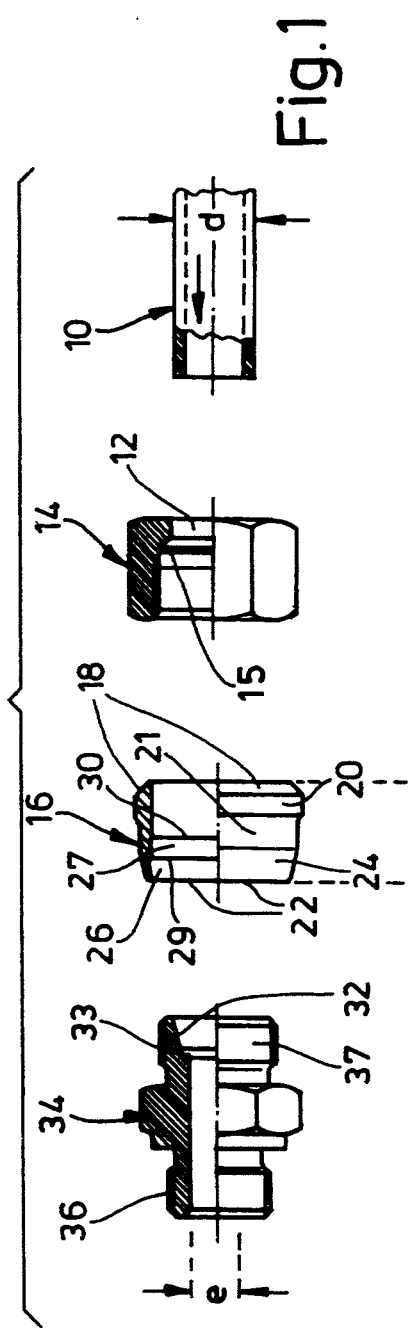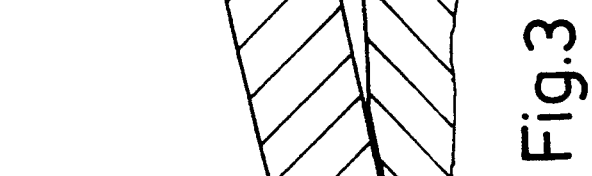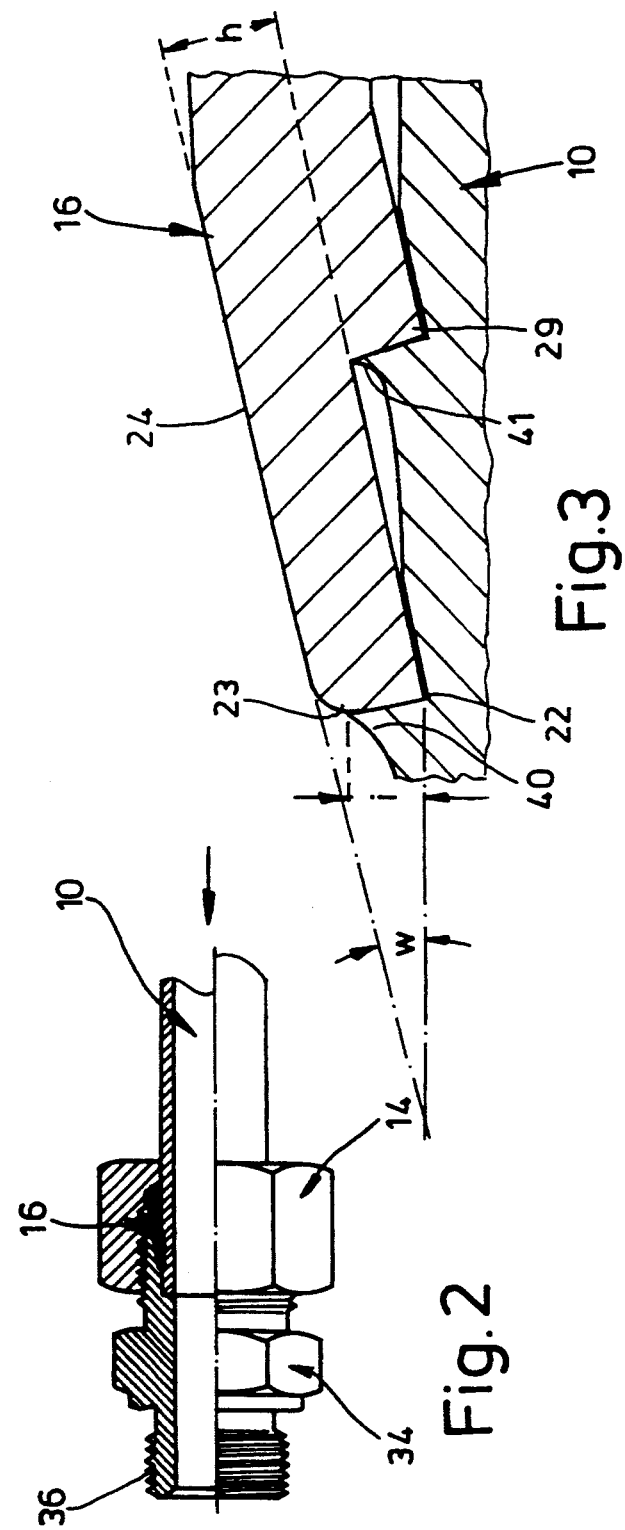

PIPE CONNECTION HAVING A CUTTING RING

BACKGROUND OF THE INVENTION

The invention relates to a pipe connection having a cutting ring which embraces the wall of the pipe and which can be pressed into same with at least one cutting edge, the cutting ring comprising a metallic compound, in particular an alloy with the constituents CrNiMo.

Pipe connections of that kind permit pipes to be quickly assembled by a solder-less screw assembly which is sealingly connected to the pipe associated therewith, by virtue of the cutting ring. Further details in respect of such screw assemblies are to be found in DIN 2353 (June 1991). Such cutting ring screw assemblies can be used as a lightweight construction in particular in relation to conduits for compressed air in the low-pressure range (up to 100 bars) and as a heavyweight construction for heavy engineering, above 250 bars.

The cutting rings are usually made from austenitic standard steel (for example X 10 CrNiMo 18 10 2, material No 1.4571). Such cutting rings are too soft to cut into another steel. As austenitic steel does not pass through any transformation, it cannot be hardened; it is only possible to effect surface hardening in which an additional substance—for example nitrogen and/or carbon—is incorporated in the surface region. Admittedly that operation results in a surface hardening effect and thus ensures cutting durability, but at the same time such measures result in a particularly disadvantageous fashion in limitations in terms of resistance to corrosion of the basic steel.

In consideration of that state of the art, the inventor set himself the aim of improving a pipe connection of the kind set forth in the opening part of this specification and increasing the notching capability of its cutting ring without a reduction in other features in respect of quality.

SUMMARY OF THE INVENTION

The teaching set forth in the independent claim provides for the attainment of that object; the appendant claims set forth further advantageous configurations.

What is proposed is a cutting ring comprising stainless steel, which retains its cutting capability by virtue of a cold work-hardening effect. For that purpose in particular the following groups of steels are to be used:

stainless austenitic standard steel (for example material No 1.4571);

nitrogen-alloyed and/or pressure-nitrogen-alloyed stainless steel (for example No. 1.4565);

stainless, ferritic-austenitic duplex steel such as No 1.4462.

Preferably the tube—or the bar material from which the cutting ring is to be produced—is cold hardened as a preliminary material, but it is also possible for the cold hardening operation according to the invention to be carried out directly on the cutting ring after it has been shaped. A cutting ring made from cold-hardened tube comprising the steel X 2 CrNiMoN 22 5 3—material No 1.4462—is of particular significance. The resistance to corrosion of that material is better than in the case of austenitic standard steel. As no surface hardening operation has to be performed and as cold hardening does not result in a reduction in the level of resistance to corrosion, this provides a cutting ring with an extremely high level of resistance to corrosion.

It is known that the strength properties of stainless steel can be increased by a cold working operation. That increase occurs in terms of the elastic limit to a greater degree than in relation to strength.

The fact of the cutting ring cutting into the pipe to be provided with the connection in turn also represents a cold working operation with accompanying cold hardening; the average man skilled in the art is aware of that so that he does not expect to find along those lines a solution to his problem by virtue of the use of cold-hardened Nirosteel. It is also known that an increase in hardness of austenitic steel is to be expected by cold hardening only to a slight degree. Cutting articles, cutlery, tools or the like are therefore nowadays still made from hardened martensitic stainless steel as the required cutting durability cannot be achieved with austenitic stainless steels. However the resistance to corrosion of those martensitic chromium steels which are used in the cutting article industry is not sufficient for the high requirements in terms of corrosion made on the cutting rings ('Nichtrostende Stahle' Stahl u. Eisen-Verlag, 2nd edition, pages 279/280).

The fact that producing cutting rings from a cold-hardened portion of stainless steel gives a very good result is something that remains surprising to the man skilled in the art. The 'hardening effect', by way of a cold work-hardening operation, takes place over the entire cross-section while hitherto it was only possible to harden the edge zone in relation to cutting rings; that difference further results in a marked improvement in the effect of cutting into a pipe.

Further advantages, features and details of the invention will be apparent from the following description of a preferred embodiment and with reference to the drawing.

BRIEF DESCRIPTION OF THE DRAWINGS

FIG. 1 is a partly sectional side view of the parts of a solderless pipe connection with cutting ring, in highly diagrammatic form, FIG. 2 shows the pipe connection after assembly of the individual parts, and FIG. 3 shows a portion from FIG. 2 on an enlarged scale.

DETAILED DESCRIPTION

The present invention is drawn to an improved pipe connection having a cutting ring which embraces the wall of the pipe and which can be pressed into same with at least one cutting edge, the cutting ring comprising a metallic compound, in particular an alloy with the constituents CrNiMo, characterised by a cutting ring which is cut to length and shaped from an elongate portion that is drawn from stainless steel and cold hardened. Another improved pipe connection has a cutting ring which is cut to length from a tube that is drawn from stainless steel, and which is then shaped and cold hardened.

A metal pipe 10 of for example an outside diameter d of 30 nm for nominal pressures of up to about 250 bars, which is subjected to severe pressure shocks, vibration and high levels of mechanical loadings, for example in heavy engineering in the chemical industry, in casting cooling installations or the like, is lightly deburred on the inside and the outside (not shown in the drawing) and then inserted into an internal passage 12 in a cap nut 14. As FIG. 2 clearly shows, the cap nut 14 engages over a cutting ring 16 of a length n of in this case 13.5 mm, through which the pipe 10 also passes and which, with a conically tapering end face 18 of an annular collar portion 20, bears against a correspondingly extending internal surface 15 on the nut.

Adjoining the annular collar portion 20 of the cutting ring 16, in the cross-section thereof, is a sleeve portion 21 with an end region 24 which tapers conically to a cutting edge 22 and which on the inside provides two inclined annular strips 26, 27 which in turn represent cone surfaces; the annular strips 26, 27 produced two internal cutting edges 29, 30.

Associated with the cutting ring 16 is the internal cone 3,2 of a connecting nipple 34 which at the other end is provided with an external screwthread 36. The internal cone 32 terminates at an abutment shoulder 33 for the pipe 10; the inside diameter e of the connecting nipple 34 corresponds to the inside diameter of the pipe 10.

When the cap nut 14 is tightened, the cutting ring 16 is guided into the internal cone 32 which presses the cutting edge 22 into the surface of the pipe 10, during the operation of tightening the cap nut 14 which engages with an external screwthread 37 on the internal cone 32.

FIG. 3 shows that an annular raised portion or mound 40, 41 is formed on the pipe 10 at the end face 23 of the cutting edges 22, 29. At the same time the pipe 10 is guided sealingly against the abutment shoulder 33. The cutting ring 16 wedges itself fast at the described end face 18 due to the pressure of the cap nut 14.

The cutting ring 16 is made from cold-hardened tube consisting of the steel X 2 CrNiMoN 22 5 3—material No 1.4462. The resistance to corrosion of that material is better than in the case of austenitic standard steel. As no surface hardening operation has to be carried out and as a cold work-hardening operation does not lead to a reduction in the level of resistance to corrosion, this is a cutting ring with an extremely high level of resistance to corrosion.

The depth of penetration i of the cutting edge 22 corresponds to abut two thirds of the thickness h of the end region 24 whose cone angle w here measures about 15°.

What is claimed is:

1. A pipe connection comprising a shaped elongated cutting ring which embraces a wall of a pipe, said cutting ring having at least one cutting edge, means associated with said cutting ring for pressing said at least one cutting edge into the wall of the pipe, said cutting ring comprising a stable austenitic stainless steel CrNiMo alloy compound in cold hardened condition.

2. A pipe connection according to claim 1 wherein said compound is an austenitic-ferritic duplex steel compound.

3. A pipe connection according to claim 2 wherein said compound is nitrogen alloyed.

4. A pipe connection according to claim 3 wherein said compound is steel x 2 CrNiMoN 22 53.

5. A method for forming a pipe connection having a cutting ring provided with at least one cutting edge comprising:
providing a CrNiMo stainless steel alloy;
drawing said alloy to form a hollow elongated piece;
cold working said hollow elongated piece to form a cold hardened stable austenitic alloy piece;
cutting a length from said cold hardened piece; and
forming said cutting ring.

6. A method according to claim 5 including cold working said hollow elongated piece to form a cold hardened stable austenitic-ferritic duplex steel piece.

7. A method according to claim 5 including cold working said hollow elongated piece to form a cold hardened stable steel X 2 CrNiMoN 22 5 3 piece.

8. A method according to claim 5 including cold working said hollow elongated piece to form a cold hardened stable nitrogen-alloyed steel piece.

9. A method according to claim 5 including forming said steel alloy by powder metallurgy.

10. A method for forming a pipe connection having a cutting ring formed with at least one cutting edge comprising:
providing a CrNiMo stainless steel alloy;
drawing said alloy to form a hollow elongated piece;
cutting a length from said hollow elongated piece;
forming said cutting ring from said length of said hollow elongated piece; and
cold working said cutting ring to form a cold hardened stable austenitic alloyed piece.

11. A method according to claim 10 including cold working said hollow elongated piece to form a cold hardened stable austenitic-ferritic duplex steel piece.

12. A method according to claim 10 including cold working said hollow elongated piece to form a cold hardened stable steel X 2 CrNiMoN 22 5 3 piece.

13. A method according to claim 10 including cold working said hollow elongated piece to form a cold hardened stable nitrogen-alloyed steel piece.

14. A method according to claim 10 including forming said steel alloy by powder metallurgy.

* * * * *